(No Model.)
C. TAYLOR.
VEHICLE WHEEL.
No. 395,523.　　　　　　　　　　Patented Jan. 1, 1889.
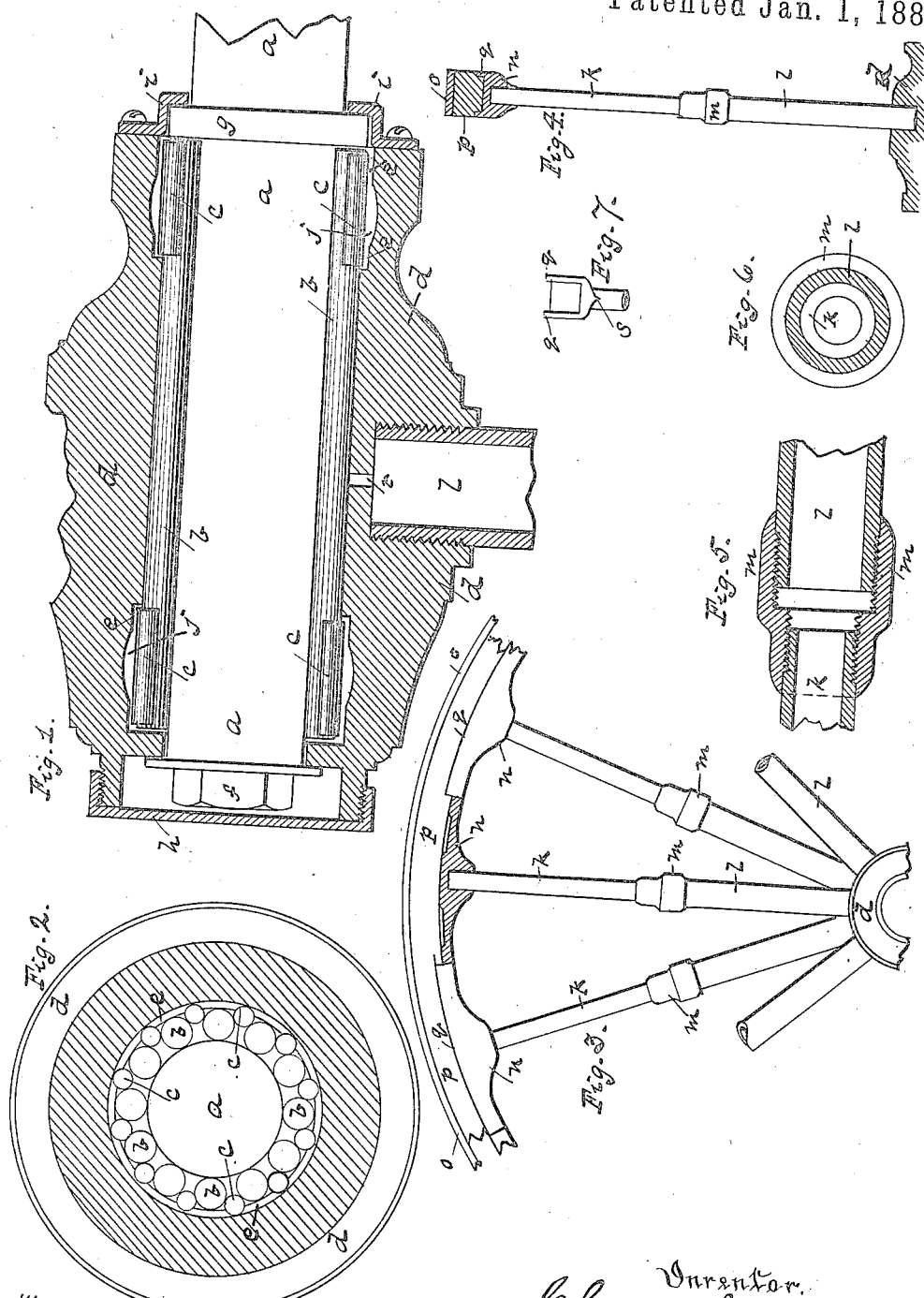
Witnesses:
Inventor.
Charles Taylor
Per. O. D. Lewis
Attorney.

UNITED STATES PATENT OFFICE.

CHARLES TAYLOR, OF ELIZABETH, PENNSYLVANIA.

VEHICLE-WHEEL.

SPECIFICATION forming part of Letters Patent No. 395,523, dated January 1, 1889.

Application filed December 19, 1887. Serial No. 258,409. (No model.)

*To all whom it may concern:*

Be it known that I, CHARLES TAYLOR, a citizen of the United States, residing at Elizabeth, in the county of Allegheny and State of Pennsylvania, have invented certain new and useful Improvements in Vehicle-Wheels and Journal-Bearings; and I do hereby declare the following to be a full, clear, and exact description of the invention, such as will enable others skilled in the art to which it pertains to make and use the same, reference being had to the accompanying drawings, which form a part of this specification.

My invention relates to an improvement in vehicle-wheels and journal-bearings for the same, the objects being to provide a wheel of great strength having detachable, interchangeable, and adjustable parts, to provide a bearing that will have but little friction, and a means for excluding dust or dirt from the same; and with these ends in view my invention consists in certain details of construction and combination of parts, as will be fully set forth hereinafter.

In the accompanying drawings, Figure 1 is a sectional elevation of my improved journal-bearing constructed in accordance with my invention. Fig. 2 is a transverse sectional view of the same, showing the position and arrangement of the frictional rollers. Fig. 3 is a side elevation of a portion of my improved vehicle-wheel, partly shown in section. Fig. 4 is a sectional elevation of the same. Fig. 5 is a sectional view of one of the couplings used for connecting the sectional spokes of the wheel. Fig. 6 is an end view of the same. Fig. 7 is an end view of the segmental bearing of the tire of the wheel.

To put my invention into practice with a journal, $a$, I provide a number of cylindrical rollers, $b$, and arrange the same inside a hub, $d$, between the journal $a$ and the inner surface of the same. At either end of these rollers $b$, I place a series of short intermediate rollers, $c$, of less diameter, which operate in a recess, $e$, formed in the hub $d$. These rollers $c$ have short bearings at their extremities, which reduce the friction on the same. At the outer end of the journal $a$ is placed a nut, $f$, which, in conjunction with a collar, $g$, formed at the rear, serves to hold the hub $d$ and bearings in the proper position. At the front of the journal $a$ is secured a cap, $h$, which, with a flexible washer, $i$, attached to the rear, prevents any dust or dirt from entering the journal-bearing to interfere with the proper working of the same. To this hub $d$, I attach a suitable number of sectional spokes, consisting of two sections, $k$ $l$, of tubing secured together by a coupling, $m$, those sections $l$ attached to the hub $d$ being of greater diameter than those $k$, secured to the segmental bearings $n$, which serve to hold the tire $o$ or felly $p$ in place. The coupling $m$, I chamfer about the outer edges in a manner that will prevent an accumulation of dirt or dust. In securing the two sections $k$ $l$ of the spokes to this coupling $m$, I form the screw-threads in a manner that will conceal the same from the outside. At the extremity of the smaller section, $k$, of the spokes I secure a segmental bearing, $n$, having two outwardly-projecting flanges, $q$, which retains the tire $o$ or felly $p$ in place. These bearings $n$ have a sharpened inner edge, $s$, which will prevent the same from lifting dirt when the wheel is in motion. (See Fig. 7.) One or more of these hollow spokes I convert into a receptacle for oil or other suitable lubricant. Such spokes will have a small opening, $r$, (see Fig. 1,) communicating with the interior of the same and the journal-bearing.

Having thus described my invention, what I claim, and desire to secure by Letters Patent, is—

1. In a journal-bearing such as described, the combination consisting of the journal $a$ and hub $d$, and the parallel series of bearing-rollers $b$, having arranged at either ends short intermediate rollers, $c$, as and for the purpose set forth.

2. In a journal-bearing such as described, the hub $d$, having arranged therein a series of parallel rollers, $b$, and short intermediate rollers, $c$, the recesses $j$, for reducing the friction on the same, the cap $h$, and flexible covering $i$, for excluding dust from the journal, as and for the purpose described.

3. In a journal-bearing such as described, the hub $d$, having arranged therein and about the journal $a$ a series of parallel rollers, $b$, and intermediate rollers, $c$, the recesses $j$, for reducing the friction on the same, the cap $h$, and flexible cover $i$, for excluding dust from the journal $a$, in combination with the adjustable and detachable metallic spokes, consisting of the tubes $k\ l$, of large and small diameter, and a suitably-constructed metallic bearing, $n$, for the reception of the tire $o$ or felly $p$, substantially as described.

4. In a vehicle-wheel, the combination consisting of the metallic hollow spokes $k\ l$, divided into sections and secured together by a suitable coupling, $m$, and the segmental bearing $n$, recessed on its outer face for the reception of the tire $o$ or felly $p$, substantially as set forth.

5. In a vehicle-wheel such as described, the hollow spokes $k\ l$, divided into sections for the purpose of reducing the weight and diameter of the outer ends of the same, and a means for securing the sections together.

6. In a vehicle-wheel such as described, consisting of the sectional spokes $k\ l$, the segmental bearing $n$, having a sharp inner edge, $s$, for the purpose of allowing the same to be easily lifted or raised out of soft or moist earth.

CHARLES TAYLOR.

Witnesses:
  H. T. MORRIS,
  M. E. HARRISON.